(12) United States Patent
Miyoshi

(10) Patent No.: US 12,093,588 B2
(45) Date of Patent: Sep. 17, 2024

(54) IMAGE FORMING APPARATUS THAT SELECTIVELY PERMITS REMOTE PRINTING OF RETAINED PRINT JOBS, METHOD OF CONTROLLING IMAGE FORMING APPARATUS, AND STORAGE MEDIUM

(71) Applicant: CANON KABUSHIKI KAISHA, Tokyo (JP)

(72) Inventor: Tomoya Miyoshi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/158,759

(22) Filed: Jan. 24, 2023

(65) Prior Publication Data
US 2023/0251808 A1   Aug. 10, 2023

(30) Foreign Application Priority Data
Feb. 9, 2022 (JP) .................... 2022-018890

(51) Int. Cl.
*G06F 3/12* (2006.01)

(52) U.S. Cl.
CPC .......... *G06F 3/1267* (2013.01); *G06F 3/1203* (2013.01); *G06F 3/1222* (2013.01); *G06F 3/1238* (2013.01)

(58) Field of Classification Search
CPC .... G06F 3/1267; G06F 3/1203; G06F 3/1222; G06F 3/1238; G06F 3/1237; G06F 3/1268
USPC .............................. 358/1.14, 1.15
See application file for complete search history.

(56) References Cited

U.S. PATENT DOCUMENTS

| 11,256,454 | B2 * | 2/2022 | Nakajima | G06F 3/1204 |
| 2015/0002882 | A1 * | 1/2015 | Nakajima | G06F 3/1286 358/1.14 |
| 2020/0133591 | A1 * | 4/2020 | Kaneda | G06F 3/122 |
| 2020/0387333 | A1 * | 12/2020 | Nakajima | G06F 3/1238 |
| 2020/0406653 | A1 * | 12/2020 | Kubota | G06F 3/1238 |
| 2022/0188051 | A1 * | 6/2022 | Tokumoto | G06F 3/1204 |

FOREIGN PATENT DOCUMENTS

JP    2019196018 A    11/2019

OTHER PUBLICATIONS

Sweet et al. "IPP Storage Extensions v1.0" IPP Registration Draft, The Printer Working Group. Jan. 29, 2021: pp. 1-15, (https://ftp.pwg.org/pub/pwg/ipp/wd/wd-ippstorage10-20210129.pdf). Cited in the specification.

* cited by examiner

*Primary Examiner* — Kent Yip
(74) *Attorney, Agent, or Firm* — ROSSI, KIMMS & McDOWELL LLP

(57) ABSTRACT

An imaging apparatus has a storage function for storing a print job received from an external apparatus. In response to receiving, by the CPU, a remote release instruction of the print job from the outside when a first setting has been made as an operation setting related to a storing function, the CPU controls so that print processing is executed based on the print job stored by the storing function. When a second setting is made as an operation setting related to the storing function, the CPU controls so that the print processing is not executed even if the remote release instruction is received from the outside.

14 Claims, 12 Drawing Sheets

FIG. 6A

```
HOLD-JOB TRANSMISSION PACKET

Operation : Hold-Job Request
Attribute:
   attributes-charset:utf-8
   attributes-natural-language:ja-jp
   printer-uri:ipp://******
   requesting-user-name:canon
   job-name : test.pdf Data:PRINT DATA IS OMITTED.
```

FIG. 6B

```
EVENT CONFIRMATION RESPONSE PACKET

Operation : Hold-Job Response
Status code : successful-ok
Attribute:
   attributes-charset:utf-8
   attributes-natural-language:ja-jp Job-attributes-tag:
job-id : 1
job-uri : ipp://canon.local/job-1
job-state : saved
job-state-reasons : job-saved-successfully
```

FIG. 7A

```
JOB LIST ACQUISITION REQUEST PACKET

Operation : Get-Jobs Request
Attribute:
attributes-charset:utf-8
attributes-natural-language:ja-jp
printer-uri:ipp://*****
which-jobs = pending
my-jobs = false
```

FIG. 7B

```
JOB LIST ACQUISITION RESPONSE PACKET

Operation : Get-Jobs Response
Status code : successful-ok
Attribute:
job-id : 1
job-uri : ipp://canon.local/job-1
job-name : test.pdf job-id : 2
job-uri : ipp://canon.local/job-2
job-name : Fig.jpeg
```

FIG. 7C

```
JOB LIST ACQUISITION REQUEST PACKET
(IF RESPONDING WITH JOB
FROM AUTHENTICATED USER)

Operation : Get-Jobs Request
Attribute:
attributes-charset:utf-8
attributes-natural-language:ja-jp
printer-uri:ipp://*****
requesting-user-name:canon
which-jobs = pending
my-jobs = True
```

FIG. 7D

```
JOB LIST ACQUISITION RESPONSE PACKET
(IF RESPONDING WITH JOB
FROM AUTHENTICATED USER)

Operation : Get-Jobs Response
Status code : successful-ok
Attribute:
job-id : 1
job-uri : ipp://canon.local/job-1
job-name : test.pdf
```

FIG. 8A

```
HOLD-JOB PRINTING PACKET

Operation : Release-Job Request
Attribute:
  attributes-charset:utf-8
  attributes-natural-language:ja-jp
  printer-uri:ipp://******
  job-id:1
  requesting-user-name:canon
```

FIG. 8B

```
EVENT CONFIRMATION
RESPONSE PACKET
(IF RELEASE-JOB SETTING IS "ON")

Operation : Release-Job Response
Status code : successful-ok
Attribute:
 attributes-charset:utf-8
 attributes-natural-language:ja-jp
```

FIG. 8C

```
EVENT CONFIRMATION
RESPONSE PACKET
(IF RELEASE-JOB SETTING IS "OFF")

Operation : Release-Job Response
Status code : client-error-not-possible
Attribute:
 attributes-charset:utf-8
 attributes-natural-language:ja-jp
```

IMAGE FORMING APPARATUS THAT SELECTIVELY PERMITS REMOTE PRINTING OF RETAINED PRINT JOBS, METHOD OF CONTROLLING IMAGE FORMING APPARATUS, AND STORAGE MEDIUM

BACKGROUND OF THE DISCLOSURE

Field of the Disclosure

The present disclosure relates to an image forming apparatus, a method of controlling the image forming apparatus, and a storage medium.

Description of the Related Art

For the purpose of security, an image forming apparatus with a function called retained printing has been proposed. Japanese Patent Application Laid-Open No. 2019-196018 discloses an image forming apparatus with a function retaining a print job. IPP Storage Extensions v1.0 (https://ftp.pwg.org/pub/pwg/ipp/wd/wd-ippstorage10-20210129.pdf, retrieved Oct. 13, 2021) discloses a technique for retaining and reusing a print job in an image forming apparatus on a printing framework based on an IPP (Internet Printing Protocol).

On the other hand, if the retained job stored in the image forming apparatus can be released based on an instruction from an external apparatus such as a client terminal, printed matters may be left unattended, for example, which raises a security risk. In contrast, if no release is permitted for the retained job based on an instruction from the external apparatus, the release of the retained job may be restricted to printing via an operation unit of the image forming apparatus (for example, authentication printing), resulting in reduced convenience. Based on the foregoing background, there is a need to realize a scheme that can flexibly set whether the retained job stored in the image forming apparatus can be released based on an instruction from the external apparatus according to an operation policy.

SUMMARY OF THE DISCLOSURE

In view of the above problems, it is an object of the present disclosure to enable printing processing using a function for storing a print job in an image forming apparatus in a more suitable manner.

According to an aspect of the present disclosure, an image forming apparatus storing a print job received from an external apparatus comprises one or more memories and one or more processors that execute instructions to print the stored print job in response to receiving an instruction for remote release of the stored print job from the external apparatus, in a case of a first setting for storing the print job, and not print the stored print job in response to receiving the instruction for the remote release of the stored print job from the external apparatus, in a case of a second setting for storing the print job.

Further features of the present disclosure will become apparent from the following description of exemplary embodiments with reference to the attached drawings.

BRIEF DESCRIPTION OF THE DRAWINGS

FIG. 6A illustrates an example showing a packet related to job transmission.

FIG. 6B illustrates an example showing a packet related to job transmission.

FIG. 7A illustrates an example showing a packet related to the acquisition of the job list.

FIG. 7B illustrates an example showing a packet related to the acquisition of the job list.

FIG. 7C illustrates an example showing a packet related to the acquisition of the job list.

FIG. 7D illustrates an example showing a packet related to the acquisition of the job list.

FIG. 8A illustrates an example showing a packet related to the release of the retained job.

FIG. 8B illustrates an example showing a packet related to the release of the retained job.

FIG. 8C illustrates an example showing a packet related to the release of the retained job.

DESCRIPTION OF THE EMBODIMENTS

Figure 1:
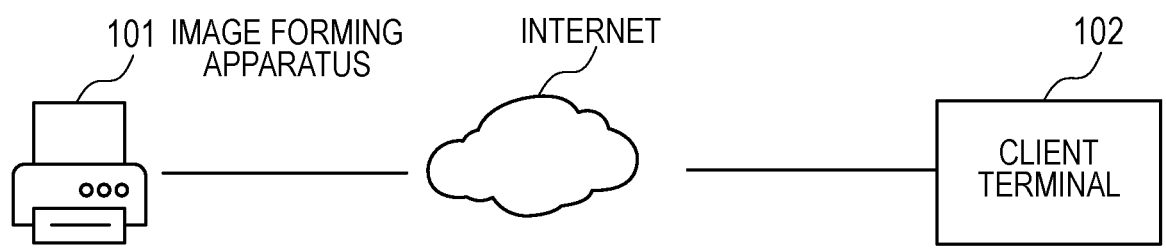
FIG. 1 illustrates an example showing a system configuration including an image forming apparatus.

The present embodiment of the disclosure is described in detail below with reference to the accompanying drawings. In the specification and the drawings, components having substantially the same functional configuration are assigned with the same symbols, thereby omitting duplicate descriptions.

Introduction

Among various image forming apparatuses, the image forming apparatus with a function called retained printing (in other words, a storing function that stores jobs received from an external apparatus) has been proposed to ensure security. Also, a printing framework called the IPP discloses a technique for retaining and reusing the print job in the image forming apparatus.

Specifically, the IPP specifies attributes such as Hold-Job operation, Release-Job operation, and the like, to realize retaining jobs. Upon receiving a print job specifying the attributes, the image forming apparatus stores the print job in a job storage of the image forming apparatus.

The image forming apparatus with the job storage responds to capability inquiries from a client terminal with capability information indicating that the image forming apparatus supports the Hold-Job operation and the Release-Job operation. The client terminal displays a print setting screen based on the capability information notified by the image forming apparatus. When the Hold-Job operation is selected in the print setting screen and a print instruction is given, the client terminal transmits the print job to the image forming apparatus with the Hold-Job operation. Upon receiving the print job specifying the attributes, the image forming apparatus temporarily stores the print job in the job storage without immediately executing the print processing based on the print job. In the following description, the function of temporarily storing the print job in the job storage without immediately executing the print processing based on the print job received by the image forming apparatus is also referred to as the retention function. The print job that is retained by the retention function (that is, the print job stored in the job storage) is also called a retained print job.

When printing is executed using the retained print job based on the instruction from the client terminal, the print instruction including the attribute called Release-Job is transmitted from the client terminal to the image forming apparatus. Upon receiving the print instruction, the image forming apparatus controls the printing based on the corresponding print job.

An administrator of the image forming apparatus should set appropriately whether or not the retained print job stored in the image forming apparatus can be released based on the instruction from the external apparatus such as a client terminal in accordance with the operational policy.

As a specific example, in order to improve security, it may be assumed that the release of the retained print job received from the client terminal is not permitted, while the release of the retained print job is permitted only by the printing instruction with an authentication via an operation unit of the image forming apparatus. If the Release-Job operation of the IPP is set to be executable in a case where such an operation is assumed, the print job may be released based on the instruction from the client terminal. Therefore, the client terminal can instruct remote release unintended by the administrator. Under such circumstances, the security risk may arise. For example, the printed matters based on the printing instruction from the client terminal may be left unattended. On the other hand, if all Release-Job operations from the client terminal are set not to be permitted, the convenience of the printing may be reduced because remote releases are effectively unavailable.

In view of these circumstances, the present disclosure proposes a technique that enables to control the execution of print processing in a more favorable manner based on the print job stored in the image forming apparatus under situations where the retention function storing the print job temporarily in the image forming apparatus is available.

System Configuration

An example of the system configuration including the image forming apparatus according to the embodiment in the present disclosure will be described with reference to FIG. 1. The system of the present embodiment includes an image forming apparatus 101 and a client terminal 102. The image forming apparatus 101 and the client terminal 102 are connected to transmit and receive information to each other via a predetermined network (for example, the Internet, and the like).

The client terminal 102 is schematically shown as a terminal apparatus used for transmitting the print job to the image forming apparatus 101. When the image forming apparatus 101 receives the print job from the client terminal 102, the image forming apparatus 101 controls the execution of the print processing based on the conditions included in the print job.

Hardware Configuration of the Image Forming Apparatus

Figure 2:
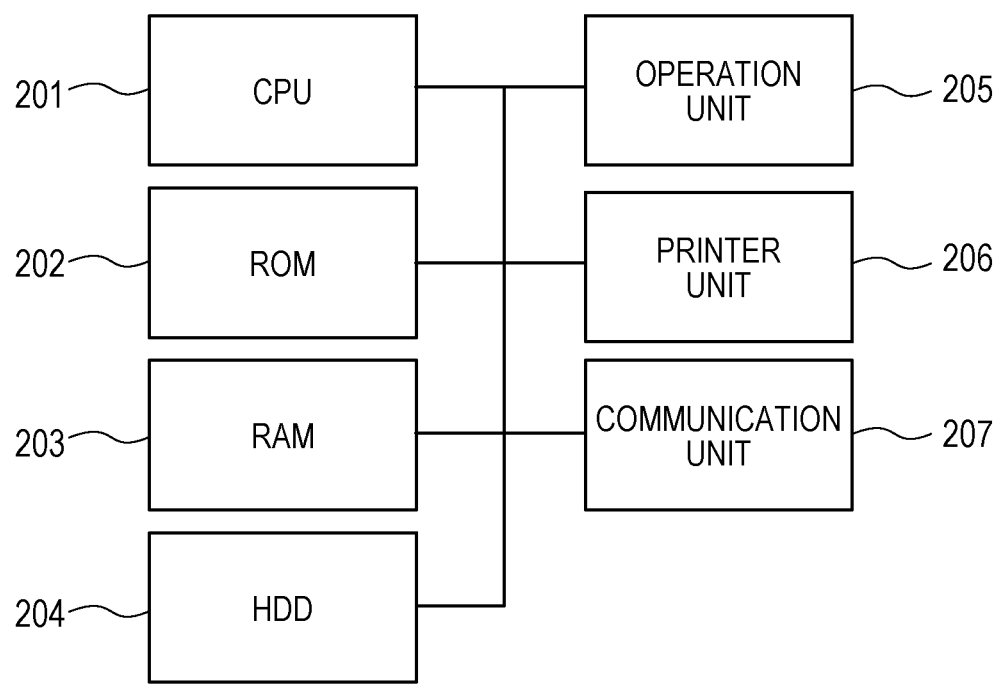
FIG. 2 illustrates an example showing a hardware configuration of the image forming apparatus.

An example of the hardware configuration of the image forming apparatus 101 will be described with reference to FIG. 2. The image forming apparatus 101 includes a CPU (Central Processing Unit) 201, a ROM (Read Only Memory) 202, and a RAM (Random Access Memory) 203. The image forming apparatus 101 also includes an HDD (Hard Disc Drive) 204, an operation unit 205, a printer unit 206, and a communication unit 207.

The CPU 201 directly or indirectly controls each component (for example, the ROM 202, the ROM 203, and the like) connected via an internal bus and executes a program to realize the functions of the image forming apparatus 101 of the present embodiment. The ROM 203 stores a control program (for example, BIOS, and the like) executed by the CPU 201. The RAM (direct memory apparatus) 203 is utilized as a work area of the CPU 201 or as a primary storage area for loading software modules for implementing the functions of the image forming apparatus 101.

The HDD 204 stores basic software such as an operating system (OS) and software modules. In the present embodiment, the HDD is used as an example of auxiliary storage apparatus, but the auxiliary storage apparatus is not limited to the HDD. As a concrete example, non-volatile memories such as SSD (Solid State Drive) may be used as an auxiliary storage apparatus. In this way, hardware such as the CPU 201, the ROM 202, the RAM 203, and the HDD 204 are included in a computer.

The operation unit 205 may perform a role as a user interface. The operation unit 205 is realized by, for example, a touchable display, and functions as a display unit for presenting information to the user and a reception unit for receiving operations from the user.

The printer unit 206 is a printer engine that prints print data designated as an object of print processing. For example, the printer unit 206 executes print processing based on the print data received from the outside via the communication unit 207.

The communication unit 207 is a network interface for connecting to a network such as the internet or an office LAN (Local Area Network). The configuration of the communication unit 207 may be changed appropriately according to the types of networks to be connected and communication methods to be applied.

In the image forming apparatus 101 of the present embodiment, one CPU 201 uses memory (the RAM 203 and the ROM 202) to execute each process shown in a flowchart described later, but the present embodiment is not necessarily limited to the configuration of the image forming apparatus 101. As a specific example, a plurality of processors, memories, and storages may work together to perform the processes of the flowchart described below. Further, the configuration of the image forming apparatus 101 may include hardware circuits used for performing a part of processing.

Overall Sequence

The processing sequence of the overall processing of the system including the image forming apparatus 101 of the present embodiment is described in a case where the retention function is used for printing the print job.

Figure 3:
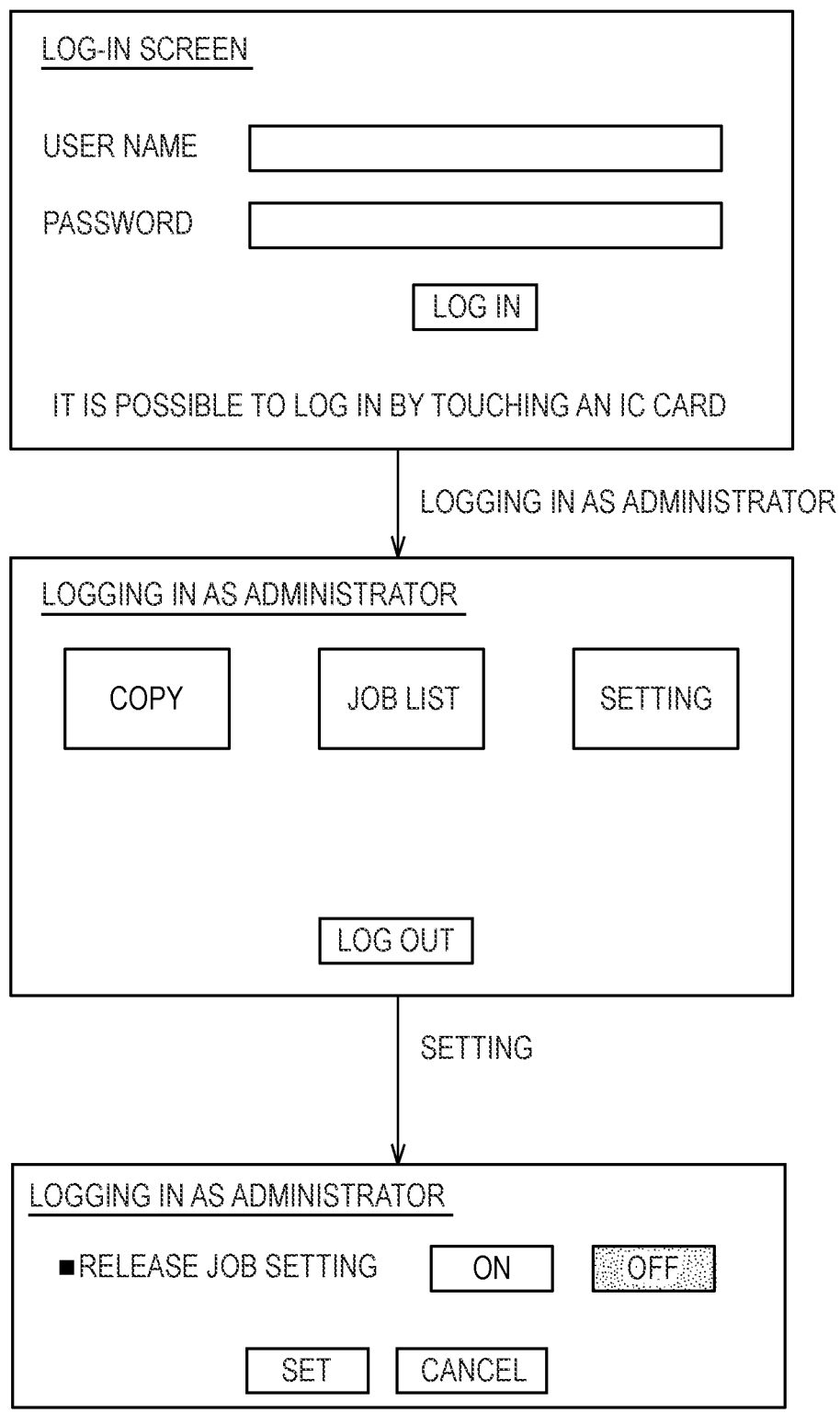
FIG. 3 illustrates an example showing a setting screen of the image forming apparatus.

FIG. 3 illustrates an example showing a setting screen for the image forming apparatus 101 of the present embodiment for switching whether to allow the image forming apparatus 101 to accept for the Release-Job operation from the client terminal. If the image forming apparatus 101 is allowed to release the print job stored in the storage apparatus of the image forming apparatus 101 based on the Release-Job operation from the client terminal, the administrator sets the Release-Job operation to a "ON" mode. On the other hand, if the image forming apparatus 101 is not allowed to release the print job stored in the storage apparatus of the image forming apparatus 101 based on the Release-Job operation from the client terminal, the administrator sets the Release-Job operation setting to a "OFF" mode. The settings specified via the screen shown in FIG. 3 are stored in the HDD 204 as operation settings. The operation settings are referred to in the processing shown in the flowchart below.

The processing sequence of the overall processing of the system including the image forming apparatus 101 of the present embodiment is described with reference to FIG. 4. In the present embodiment, the IPP is assumed to be used as a protocol between the image forming apparatus 101 and the client terminal 102.

Figure 11:
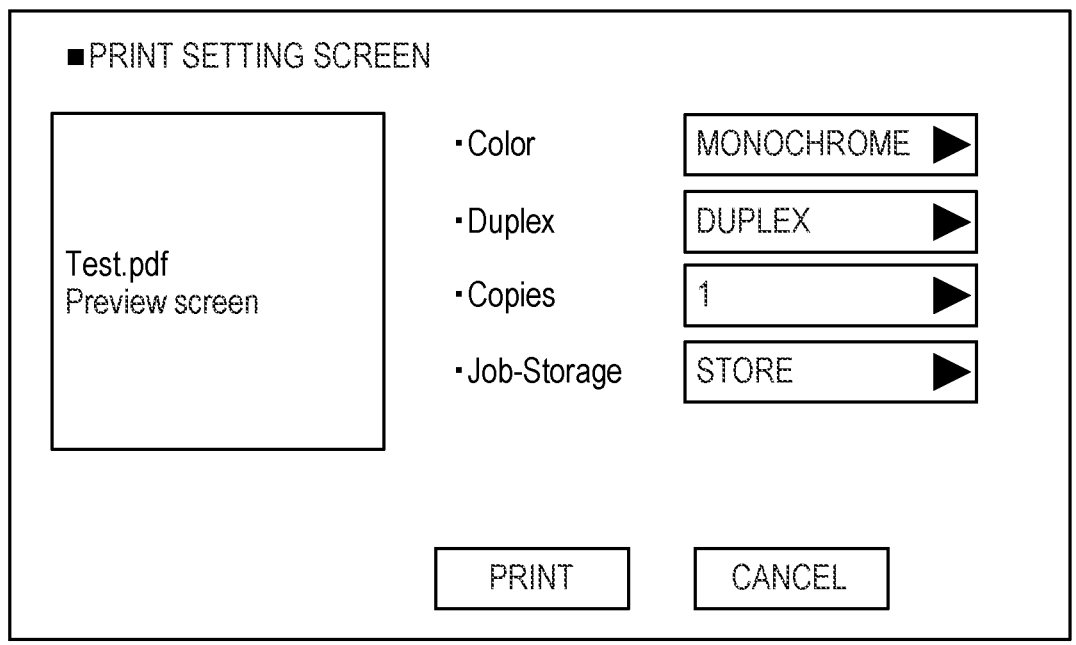
FIG. 11 illustrates an example showing the setting screen of the image forming apparatus.

In step S401, the client terminal 102 receives instructions related to printing. FIG. 11 illustrates an example showing a print setting screen for receiving various settings related to printing from the user. The client terminal 102 displays the above print setting screen on a predetermined display unit and presents the print setting screen to the user to receive the designation of various settings related to printing from the user via the print setting screen.

Figure 4:
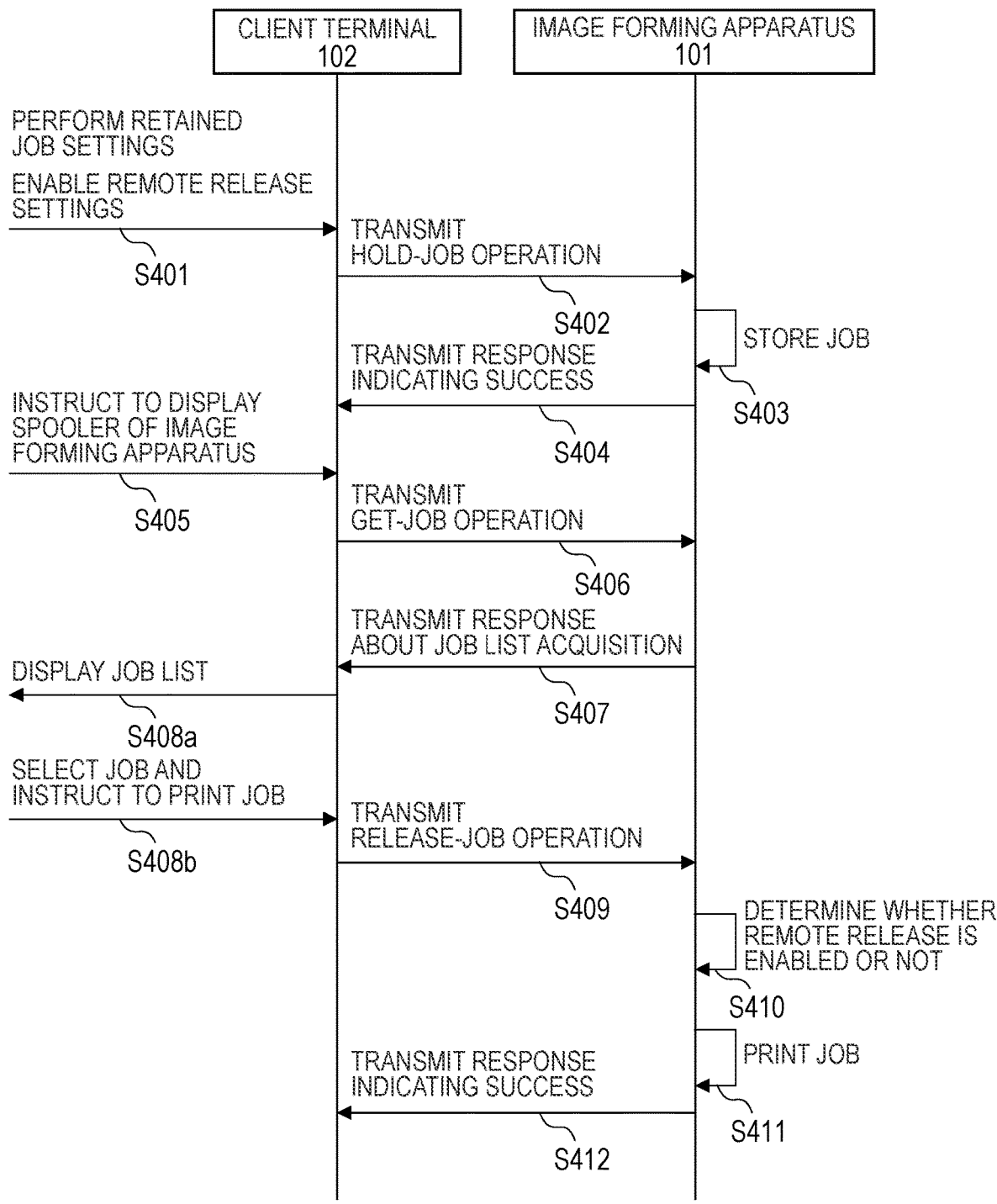
FIG. 4 illustrates a sequence diagram showing an example processing of an overall system.

In the example shown in FIG. 4, it is assumed that the print settings (settings related to the use of the retention function) are set by the instruction from the user so that the print data transmitted to the image forming apparatus 101 is stored once in the storage apparatus of the image forming apparatus 101. More specifically, it is assumed that a setting value of "store" is specified for a storage setting item indicated as "Job-Storage" of the print setting screen shown in FIG. 11, and then the instruction to start printing is given.

In step S402, the client terminal 102 generates the print job based on the various settings related to printing specified in step S401 to transmit the print job to the image forming apparatus 101. In the present embodiment, the client terminal 102 transmits the print job using the Hold-Job operation. For example, FIG. 6A illustrates an example showing a packet (a retained job transmission packet) for transmitting the print job using the Hold-Job operation.

The image forming apparatus 101 confirms a value of an operation attribute in response to receiving a packet including the print job. If the value of the operation attribute indicates the Hold-Job operation, the image forming apparatus 101 does not immediately execute print processing based on the received print job and temporarily stores the print job in the storage apparatus such as the HDD 204. That is, in step S403, the CPU 201 of the image forming apparatus 101 assigns a job ID to the print job received in step S402 and stores the print job in the storage apparatus such as the HDD 204.

If the reception of the print job is completed, in step S404, the image forming apparatus 101 transmits a success response to the client terminal 102 including the job ID assigned to the print job in step S403. For example, FIG. 6B illustrates an example showing a success response packet transmitted in step S404. The success response includes, for example, a status code indicating successful reception of the print job based on the Hold-Job operation and attribute information such as "saved" indicating that a job-state is in a saved state.

Next, the processing related to the execution of printing based on the retained print job is described. In step S405, the client terminal 102 receives from the user an instruction related to the display of a spooler screen or a print property screen of the image forming apparatus 101.

In step S406, the client terminal 102 transmits a request for a job list acquisition to the image forming apparatus 101. As a specific example, the client terminal 102 may require the job list to the image forming apparatus 101 by using Get-Jobs operation defined in the IPP. FIG. 7A illustrates an example showing a packet (a request for the job list acquisition packet) for transmitting the request for the job list acquisition using the Get-Jobs operation defined in the IPP.

In step S407, the image forming apparatus 101 transmits a response of the job list acquisition to the request for the job acquisition received in step S406. FIG. 7B illustrates an example showing a packet (a response of the job list acquisition packet) for transmitting the response of the job list acquisition from the image forming apparatus 101 to the client terminal 102 executed in step S407. The response of the job list acquisition includes a status code indicating that the job list acquisition based on the Get-Jobs operation is successful and an attribute information listing the job IDs of the retained print jobs stored in the image forming apparatus 101.

Figure 12:
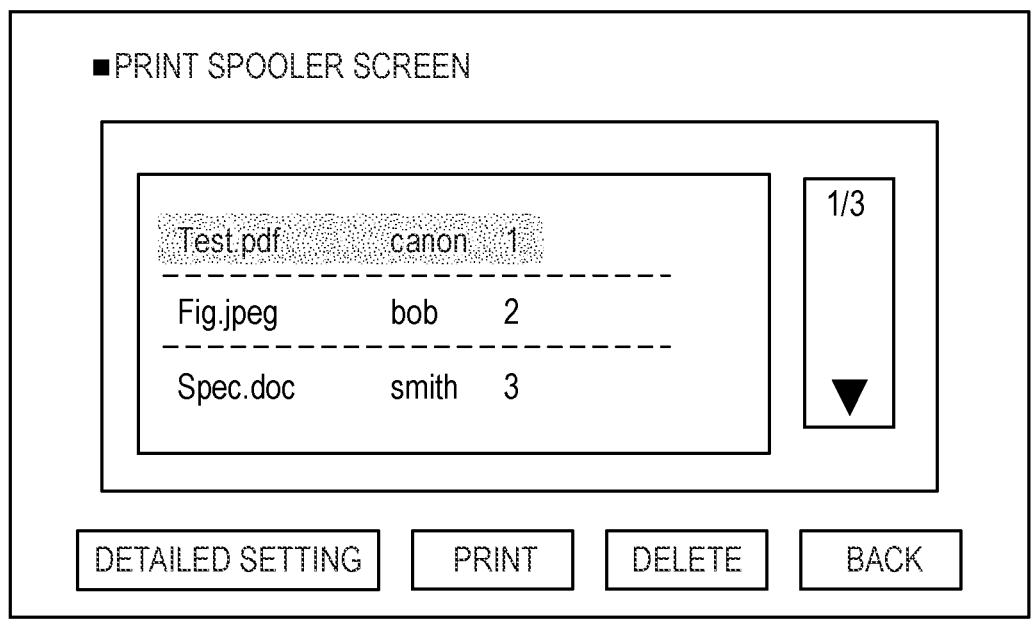
FIG. 12 illustrates an example showing the setting screen of the image forming apparatus.

In step S408a, the client terminal 102 displays a print spooler screen of the image forming apparatus 101 on a predetermined display unit of the image forming apparatus 101 based on the job ID included in the response of the job list acquisition received in step S407. FIG. 12 illustrates an example showing the print spooler screen displayed in step S408a. As shown in FIG. 12, the print spooler screen displays all the print job data stored as retained print jobs in the image forming apparatus 101 and information such as a job name, a job ID, a job owner name, and the like, for each print job. Although not shown in the example shown in FIG. 7B, information such as a job name, a job owner name, and the like may be included in the response of the job list acquisition for the request for the job list acquisition using the Get-Jobs operation.

In step S408b, the client terminal 102 receives a designation of the print job to be printed and an execution instruction of print processing based on the print job from the user.

In step S409, the client terminal 102 transmits a job print request including the job ID corresponding to the print job specified in step S408b to the image forming apparatus 101. The Release-Job operation defined in IPP can be used for the job print request. FIG. 8A illustrates an example showing a packet (printing the retained print job packet) for transmitting the job print request using the Release-Job operation defined in IPP.

In step S410, the image forming apparatus 101 determines whether to perform the remote release based on a setting value of the Release-Job operation stored in the HDD 204 as the operation setting. In the example shown in FIG. 4, the setting value of Release-Job operation is set to the "ON" mode indicating that the function of the Release-Job operation is valid, and it is determined that the image forming apparatus 101 performs remote release.

In step S411, the image forming apparatus 101 identifies the retained print job to be printed from among the retained print jobs stored in the HDD 204 based on the job print request received in step S409 to execute printing the retained print job.

In response to completing the printing in step S411, in step S412, the image forming apparatus 101 transmits a success response indicating that print processing has succeeded to the client terminal 102 that is a transmission source of the job print request in step S409. FIG. 8B illustrates an example showing a packet (an event acknowledgment packet in a case where the setting value of the Release-Job operation indicates the "ON" mode) for transmitting the success response.

In step S410, if it is not determined that the image forming apparatus 101 performs the remote release, the image forming apparatus rejects the job print request. In this case, the print processing in step S411 is not executed. Further, in step S412, the image forming apparatus 101 transmits a failure response indicating that the print processing has failed to the client terminal 102. FIG. 8C illustrates an example showing a packet (the event acknowledgment packet in a case where the setting value of the Release-Job operation indicates the "OFF" mode) for transmitting the failure response.

Processing of the Image Forming Apparatus

Figure 5:
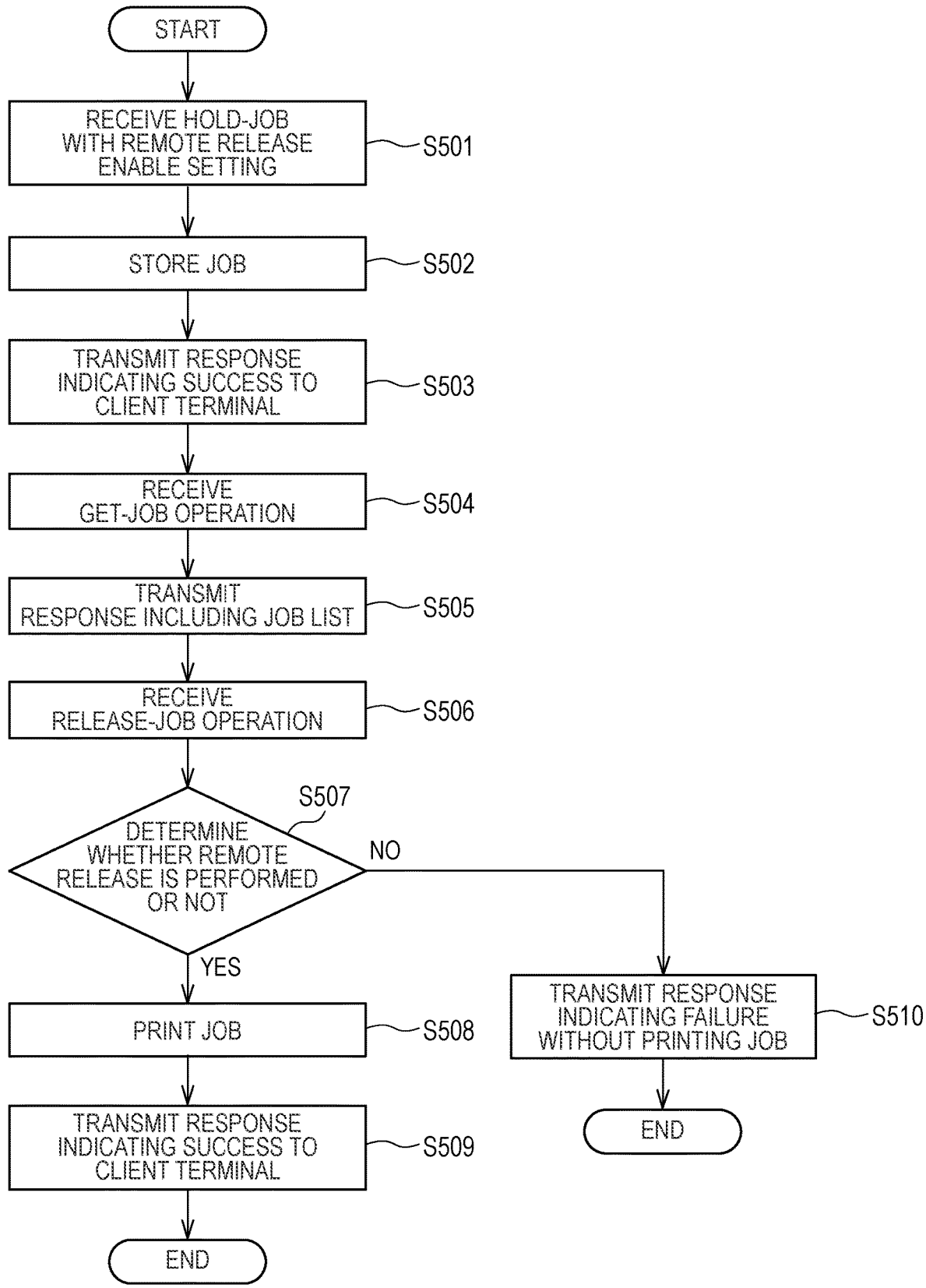
FIG. 5 illustrates a flowchart showing an example processing of the image forming apparatus.

An example of the specific control performed by the image forming apparatus 101 to realize the processing described with reference to the sequence diagram shown in FIG. 4 will be described with reference to FIG. 5. The processing corresponding to each step of the flowchart shown in FIG. 5 is realized by the CPU 201 of the image forming apparatus 101 deploying a program stored in the ROM 202 and the HDD 204 to the RAM 203 and executing the program.

In step S501, the CPU 201 receives a print request for the retained print job (the print job using the Hold-Job operation) from the client terminal 102 in cooperation with the communication unit 207.

In step S502, the CPU 201 stores the retained print job in the HDD 204 based on the print request for the retained print job received in step S501. Specifically, the CPU 201 generates the print job based on the print attributes such as the job name, job owner name, and the like included in the received print request for the retained print job and the print data, and stores the print job in the storage apparatus of the image forming apparatus 101. The job ID is assigned to the generated retained print job to identify the print job.

In step S503, the CPU 201 transmits the success response to the client terminal 102 including the job ID as shown in FIG. 6B. In step S504, the CPU 201 receives, from the client terminal 102, a request to acquire a job list as shown in FIG. 7A.

In step S505, the CPU 201 transmits to the client terminal 102 the acquisition response of the job list including the job ID of each of the retained print jobs stored in the HDD 204. In step S506, the CPU 201 receives the print request for the retained job from the client terminal 102 as shown in FIG. 8A.

In step S507, the CPU 201 determines whether to perform remote release based on the setting value of the Release-Job operation stored in the HDD 204 as the operation setting. Specifically, if the setting value of the Release-Job operation indicates the "ON" mode, the CPU 201 determines performing the remote release in step S507 and the process proceeds to step S508. On the other hand, if the setting value of the Release-Job operation indicates the "OFF" operation, the CPU 201 determines not performing the remote release in step S507 and the process proceeds to step S510.

In step S508, the CPU 201 identifies the retained print job to be printed from the retained print jobs stored in the HDD 204 based on the job ID included in the print request for the retained print job received in step S506. The CPU 201 cooperates with the printer unit 206 to execute print processing based on the print settings and print data included in the identified retained print job.

In step S509, the CPU 201 transmits the success response to the client terminal 102 as shown in FIG. 8B. In the present embodiment, the image forming apparatus 101 continues to store the retained print job without deleting the retained print job to reprint the retained print job even after the requested print processing is completed. However, the operation of the image forming apparatus 101 is not necessarily limited by the present embodiment. For example, the image forming apparatus 101 may be controlled to delete the retained print job from the HDD 204 after the requested print processing is completed. As another example, after the requested print processing is completed, the image forming apparatus 101 may be controlled to switch whether to delete the retained print job from the storage (the HDD 204) or continue to store the retained print job without deleting the retained print job according to a preset value of the operation setting.

The processing in case of the CPU 201 determining not performing the remote release in step S507 is described below. In step S510, the CPU 201 transmits the failure response as shown in FIG. 8C to the client terminal 102 without executing print processing.

As described above, the image forming apparatus 101 of the present embodiment can control whether to permit the remote release of the retained print job based on the setting value of the Release-Job operation. With such a configuration, it becomes possible to flexibly switch whether the retained print job stored in the image forming apparatus 101 can be remotely released based on the instruction from the client terminal 102 (in other words, from an external apparatus) according to the operation policy.

As a specific example, if the user such as an administrator and the like wants to prevent the occurrence of security risks associated with the printed matters being left unattended, the user may set the setting value of the Release-Job operation to the "OFF" mode to prohibit the remote release of the retained print job. As a result, since the means for instructing the image forming apparatus 101 to execute print processing based on the retained print job is limited to print instructions with authentication from the operation unit of the image forming apparatus 101, it is expected to be effective in preventing the printed materials being left unattended.

On the other hand, if the user such as an administrator and the like wants to prioritize the convenience of the end user, the user may set the setting value of the Release-Job operation to the "ON" mode to permit the remote release of the retained print job. Thus, the end user can remotely release the retained print job in the image forming apparatus 101 to execute print processing based on the retained print job via the client terminal 102 without directly operating the operation unit of the image forming apparatus 101.

Thus, according to the image forming apparatus 101 of the present embodiment, it is possible to flexibly switch whether applying an action that prioritizes security or an action that prioritizes convenience on the retained print function depending on the settings by the administrator and the like.

Modified Embodiments

Next, a variation of the image forming apparatus related to the present embodiment is described. It should be noted that each variation will be described focusing on a part different from the previous embodiment, and detailed descriptions of a part substantially same as the previous embodiment will be omitted.

First Modified Embodiment

A first modified embodiment will be described. In the previous embodiment, a setting value of the Release-Job operation indicating whether remote release is permitted or not is provided, and a scheme for restricting the execution of print processing based on remote release in a case where the setting value of the Release-Job is set to the "OFF" mode is described. In the present modified embodiment, in addition to the processing of the previous embodiment, an example of a scheme that enables the release of the retained print job in a case where a further specific condition is satisfied is described even if the setting value of Release-Job operation indicates the "ON" mode. Specifically, in the present modified embodiment, a printing scheme with high security can be provided by enabling remote release of the retained print job only if user authentication is successful (that is, only instructions from trusted users).

First, a user authentication in the IPP is described. The IPP provides a scheme for user authentication when printing is performed using the IPP protocol. In the modified embodiment, the user authentication function of the IPP provided in the image forming apparatus 101 is enabled. If the function is enabled, the user is authenticated before performing a printing operation from the client terminal 102 to the image forming apparatus 101 using the IPP protocol.

Upon receiving the IPP request from the client terminal 102, the image forming apparatus 101 requests the client terminal 102 to input user credentials. The user of the client terminal 102 inputs the user credentials such as a user ID and password via a screen (not shown). Upon receiving the input, the client terminal 102 transmits the user credentials to the image forming apparatus 101.

Upon receiving the user credentials, the image forming apparatus 101 determines whether or not to authenticate the user based on the received user credentials and the user DB (database) held by the image forming apparatus 101. If the image forming apparatus 101 determines to authenticate the user, the image forming apparatus 101 notifies the client terminal 102 that the authentication has been successful. On the other hand, if the image forming apparatus 101 determines not to authenticate the user, the image forming apparatus 101 notifies the client terminal 102 that the authentication has failed. If the authentication has been successful, the printing operation using the IPP protocol is allowed.

If printing is performed after the user authentication, the client terminal 102 adds information of identifying the authenticated user to the print job and various requests to be transmitted to the image forming apparatus 101. Specific examples will be described with reference to FIGS. 7C and 7D.

FIG. 7C illustrates an example showing a request for a job list acquisition packet transmitted from the client terminal 102 after the user authentication. The differences between FIGS. 7C and 7A are that an attribute indicating the user name is added and a my-jobs attribute is set to True. Note that FIG. 7C shows a packet if "canon" is an authenticated user.

FIG. 7D illustrates a response packet to the packet in FIG. 7C. Since the user has been identified and the my-jobs attribute indicating acquisition of the print job transmitted by the user is set to True, the image forming apparatus 101 extracts the print job associated with the user "canon" and generates a response packet.

Figure 9:
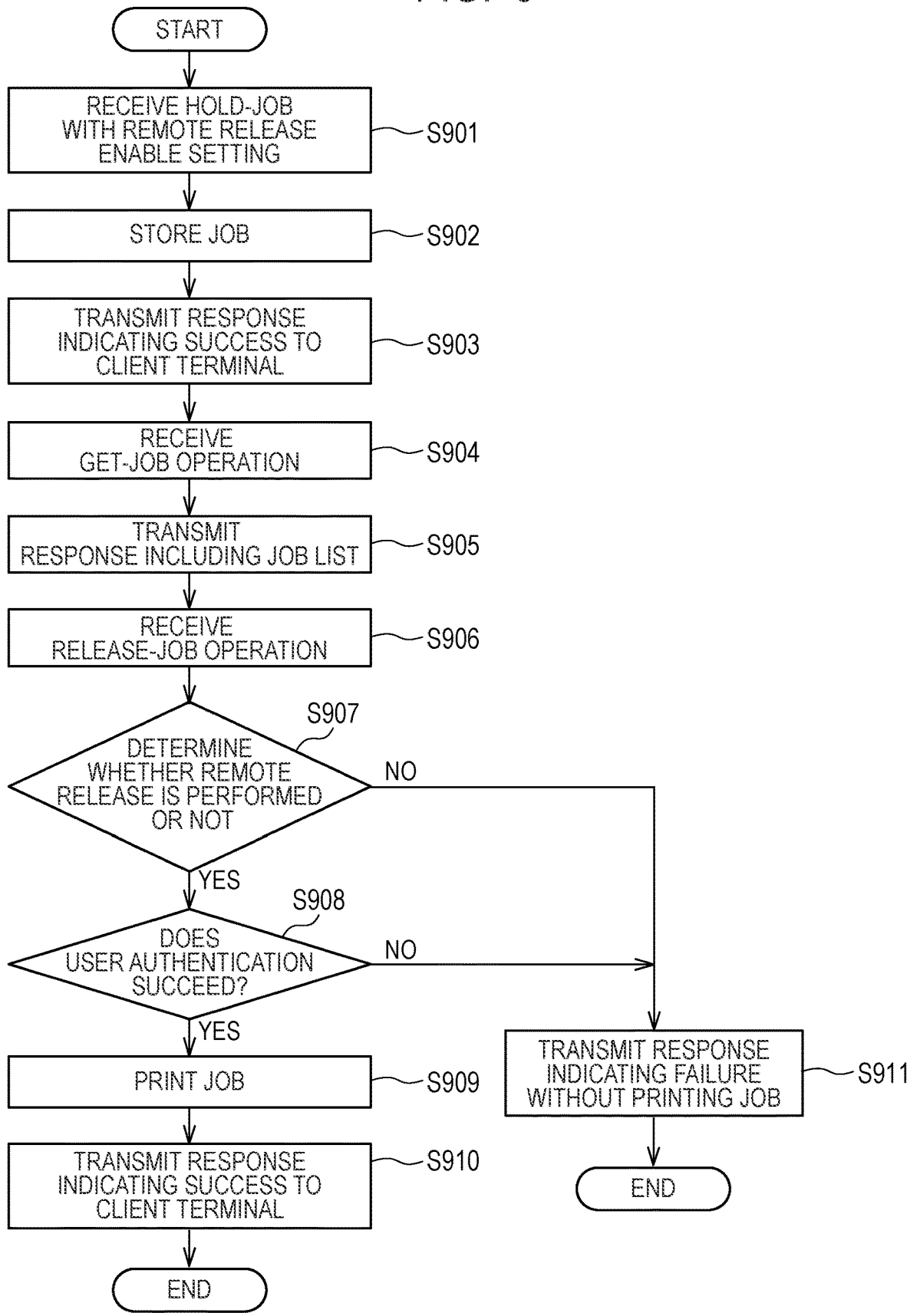
FIG. 9 illustrates a flowchart showing another example of processing of the image forming apparatus.

Next, an example of the processing of the image forming apparatus 101 according to the present modified embodiment will be described with reference to FIG. 9. The processing of steps S901 to S907 is similar to the processing of steps S501 to S507 described in the previous embodiment shown in FIG. 5. Therefore, regarding the processing of steps S901 to S907, handling of the information used to identify the user transmitting the print job will be additionally described, and the detailed descriptions for the other parts that are substantially same as the above-described embodiment will be omitted.

In step S902, the CPU 201 generates the retained print job as in step S502, and stores the retained print job in the HDD 204. At this time, if a requesting-user-name attribute is included in the Hold-Job operation shown in FIG. 6A, the CPU 201 sets the user name indicating the user who owns the print job in the retained print job based on an attribute value of the requesting-user-name attribute. The processing of steps S903 to S907 is substantially same as the processing of steps S503 to S507 shown in FIG. 5, and therefore the description is omitted.

In step S908, the CPU 201 refers to the requesting-user-name attribute included in the Release-Job operation and acquires the attribute value of the requesting-user-name attribute. On the basis of the job ID included in the Release-Job operation, the CPU 201 identifies the retained print job stored in the HDD 204 and acquires the user name set for the retained print job. The CPU 201 compares the acquired attribute value with the user name set in the specified retained print job to determine whether or not the user names match (that is, determined if the user is authenticated).

If it is determined in step S908 that the user names match (that is, the user is successfully authenticated), the CPU 201 advances the process to step S909. Since the processing of steps S909 and S910 is substantially same as that of steps S508 and S509 shown in FIG. 5, detailed descriptions are omitted.

If it is determined in step S908 that the user names do not match (that is, the user authentication fails), the CPU 201 advances the process to step S911. Since the processing of step S911 is substantially same as that of step S510 shown in FIG. 5, detailed descriptions are omitted.

As described above, in the present modified embodiment, the requesting-user-name attribute is used to authenticate the user. The user is authenticated if the user requesting the release of the print job matches the user transmitting the print job. The method of authenticating the user is not particularly limited. As a specific example, the method may be configured to authenticate users by using Basic authentication, Digest authentication, OAuth authentication, and the like.

In addition, the method may be configured to authenticate users and respond to only the job ID corresponding to the authenticated user based on the result of the authentication in response to receiving a Get-Jobs request. In this case, only the print jobs corresponding to the job ID of the authenticated user will be displayed on the client terminal 102.

As described above, in the present modified embodiment, the remote release is possible when the user authentication is successful. Therefore, even if the remote release is permitted by setting the setting value of the Release-Job operation indicating the "ON" mode, it is possible to limit the print jobs to be remotely released to the print jobs transmitted by the user using the client terminal 102. This prevents the print jobs transmitted by other users being released remotely, and allows the remote release of the print jobs transmitted by the authenticated user based on the authenticated user's operation. Therefore, it is possible to maintain convenience compared to the case where the remote release is fully prohibited, while ensuring security compared to the case where the remote release is not restricted. That is, in the present modified embodiment, it becomes possible to simultaneously ensure user convenience and security in a more favorable manner.

Second Modified Embodiment

A second modified embodiment will be described. In the present modified embodiment, an example of a case is described where a function (hereinafter also referred to as forced retention function) forcibly stores the print job received from the external apparatus in the storage of the image forming apparatus 101 without immediately printing the print job. That is, if the forced retention function is enabled, regardless of information set in the print job or instructions from the external apparatus, the print job received from the external apparatus is temporarily stored in the storage apparatus of the image forming apparatus 101. It should be noted that, in the present modified embodiment, the description focuses on the processing related to the determination whether or not to remotely release the retained print job according to the setting value of the forced retention function, and the detailed descriptions for the other part substantially same as the previous embodiments are omitted.

Figure 10:
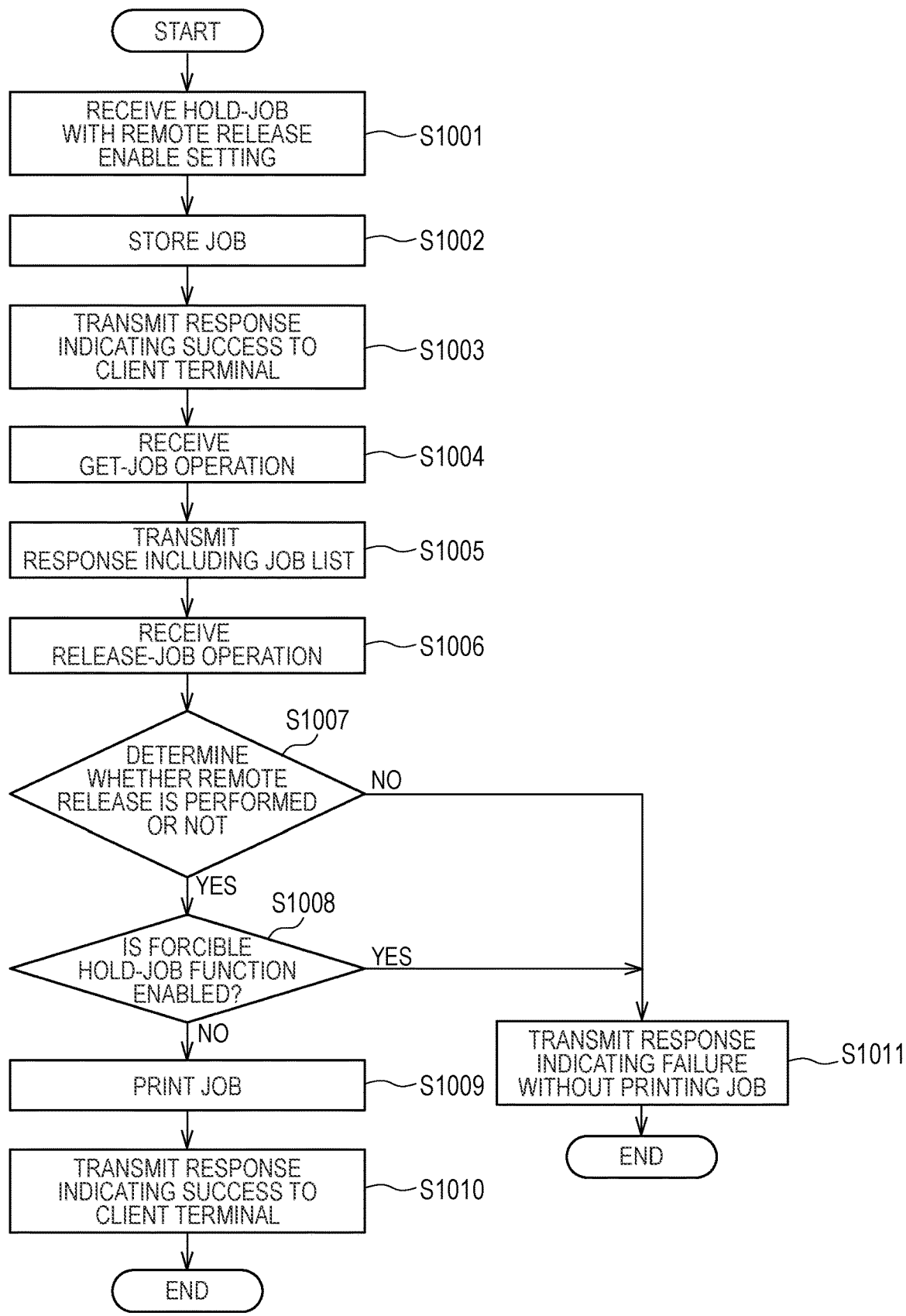
FIG. 10 illustrates a flowchart showing another example of processing of the image forming apparatus.

FIG. 10 illustrates a flowchart showing an example of processing of the image forming apparatus 101 according to the present modified embodiment. Since the processing of steps S1001 to S1007 is substantially same as the processing of steps S501 to S507 described in the previous embodiment with reference to FIG. 5, detailed descriptions are omitted.

In step S1008, the CPU 201 determines whether the setting of the forced retention function indicates the "ON" mode. If the CPU 201 determines in step S1008 that the setting of the forced retention function indicates the "ON" mode (Yes in step S1008, that is, the function is enabled), the process proceeds to step S1011. The processing of step S1011 is substantially same as that in step S510 shown in FIG. 5. That is, in this case, the execution of the print process is rejected and the failure response is transmitted to the client terminal 102.

On the other hand, if the CPU 201 determines in S1008 that the setting of the forced retention function indicates the "OFF" mode (No in step S1008, that is, the function is disabled), the process proceeds to step S1009. The processing of steps S1009 and S1010 is substantially same as that of steps S508 and S509 shown in FIG. 5. That is, in this case, print processing is executed and the success response is transmitted to the client terminal 102.

As described above, the image forming apparatus 101 according to the present modified embodiment refers to the setting value related to the forced retention function to determine whether or not to remotely release the retained print job. When such control is applied, even if the setting value of the Release-Job operation indicates the "ON" mode, the remote release can be determined according to the setting value related to the forced retention function, which further improves security.

Further, in the previous embodiment, as shown in FIG. 3, the case where the administrator instructs to set the "ON/OFF" mode via the setting value of the Release-Job operation has been described. However, the configuration or processing of the image forming apparatus 101 is not necessarily limited to the present embodiment. As a specific example, a configuration may be applied in which individual settings of the Release-Job operation are made as individual settings (personalized settings) for each user using the image forming apparatus 101. In this case, instead of the process in step S507 shown in FIG. 5, a process for identifying the user who made the release request and a process for determining whether to perform remote release based on the individual setting values of the Release-Job operation stored in association with the user may be applied.

A configuration may be applied in which setting information of the image forming apparatus 101 notified to the client terminal 102 is different depending on the "ON/OFF" mode indicated by the setting value of the Release-Job operation. Specifically, when receiving an inquiry about print setting from the client terminal 102, the image forming apparatus 101 transmits a setting response indicating that the image forming apparatus 101 supports the Release-Job operation if the setting value of the Release-Job operation indicate the "ON" mode. On the other hand, when receiving the inquiry about print setting from the client terminal 102, the image forming apparatus 101 does not transmit the setting response indicating that the image forming apparatus 101 supports the Release-Job operation if the setting value of the Release-Job operation indicates the "OFF" mode.

On this premise, the following controls may be applied on the client terminal 102. The client terminal 102 may be controlled so as not to provide the user with the function or the screen for performing the remote release if it is unable to obtain the setting response indicating that the image forming apparatus 101 supports the Release-Job operation from the image forming apparatus 101. On the other hand, the client terminal 102 may be controlled to provide the user with the function or the screen for performing the remote release if it is able to obtain the setting response indicating that the image forming apparatus 101 supports the Release-Job operation from the image forming apparatus 101.

By applying the control described above, it is also possible to control the remote release operation of the retained print job so that the remote release is not performed if the setting value of Release-Job operation indicates the "OFF" mode.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-018890, filed Feb. 9, 2022, which is hereby incorporated by reference herein in its entirety.

What is claimed is:

1. An image forming apparatus comprising:
one or more memories that store instructions; and
one or more processors that execute the instructions to:
perform a process of storing a print job received from an external apparatus;
transmit information related to the stored print job, to the external apparatus;
receive the information of the print job selected from among stored print jobs in the external apparatus that received the information, from the external apparatus; and
perform control so as to execute the selected print job based on the received information of the print job in a case where a first setting permitting remote release of the print job is made as an operation setting of print control of the image forming apparatus, and so as not to execute the selected print job based on the received information of the print job in a case where a second setting prohibiting remote release of the print job is made as the operation setting of the print control of the image forming apparatus.

2. The image forming apparatus according to claim 1, wherein the first setting is a setting to permit printing of the stored print job based on an instruction from the external apparatus, and the second setting is a setting to prohibit printing of the stored print job based on the instruction from the external apparatus.

3. The image forming apparatus according to claim 1, wherein the first setting is a setting to forcibly store the print job received from the external apparatus in the image forming apparatus, and the second setting is a setting to not forcibly store the print job received from the external apparatus in the image forming apparatus.

4. The image forming apparatus according to claim 1,
wherein the one or more processors further execute the instructions to authenticate a user instructing remote release of the stored print job, and
wherein the stored print job is printed in response to receiving the instruction for the remote release of the stored print job from the external apparatus by the authenticated user, in the case where the second setting is made as the operation setting of the print control of the image forming apparatus.

5. The image forming apparatus according to claim 1, wherein the one or more processors further execute the instructions to accept, by an operation unit, the operation setting of the print control of the image forming apparatus.

6. The image forming apparatus according to claim 1, wherein the one or more processors further execute the instructions to perform a process of storing the print job received from the external apparatus, based on an IPP (Internet Printing Protocol).

7. A method of controlling an image forming apparatus, the method comprising:
performing a process of storing a print job received from an external apparatus;
transmitting information related to the stored print job, to the external apparatus;
receiving the information of the print job selected from among stored print jobs in the external apparatus that received the information, from the external apparatus; and
performing control so as to execute the selected print job based on the received information of the print job in a case where a first setting permitting remote release of the print job is made as an operation setting of print control of the image forming apparatus, and so as not to execute the selected print job based on the received information of the print job in a case where a second setting prohibiting remote release of the print job is made as the operation setting of the print control of the image forming apparatus.

8. The method according to claim 7, wherein the first setting is a setting to permit printing of the stored print job based on an instruction from the external apparatus, and the second setting is a setting to prohibit printing of the stored print job based on the instruction from the external apparatus.

9. The method according to claim 7, wherein the first setting is a setting to forcibly store the print job received from the external apparatus in the image forming apparatus, and the second setting is a setting to not forcibly store the print job received from the external apparatus in the image forming apparatus.

10. The method according to claim 7, further comprising authenticating a user instructing remote release of the stored print job,
wherein the stored print job is printed in response to receiving the instruction for the remote release of the stored print job from the external apparatus by the authenticated user, in the case where the second setting is made as the operation setting of the print control of the image forming apparatus.

11. A non-transitory computer-readable storage medium storing program to cause a computer to perform a method of controlling an image forming apparatus storing a print job received from an external apparatus, the method comprising:
performing a process of storing a print job received from an external apparatus;
transmitting information related to the stored print job, to the external apparatus;
receiving the information of the print job selected from among stored print jobs in the external apparatus that received the information, from the external apparatus; and
performing control so as to execute the selected print job based on the received information of the print job in a case where a first setting permitting remote release of the print job is made as an operation setting of print control of the image forming apparatus, and so as not to execute the selected print job based on the received information of the print job in a case where a second setting prohibiting remote release of the print job is made as the operation setting of the print control of the image forming apparatus.

12. The non-transitory computer-readable storage medium according to claim 11, wherein the first setting is a setting to permit printing of the stored print job based on an instruction from the external apparatus, and the second setting is a setting to prohibit printing of the stored print job based on the instruction from the external apparatus.

13. The non-transitory computer-readable storage medium according to claim 11, wherein the first setting is a setting to forcibly store the print job received from the external apparatus in the image forming apparatus, and the second setting is a setting to not forcibly store the print job received from the external apparatus in the image forming apparatus.

14. The non-transitory computer-readable storage medium according to claim 11,
   wherein the method further comprises authenticating a user instructing remote release of the stored print job, and
   wherein the stored print job is printed in response to receiving the instruction for the remote release of the stored print job from the external apparatus by the authenticated user, in the case where the second setting is made as the operation setting of the print control of the image forming apparatus.

\* \* \* \* \*